United States Patent
An et al.

(10) Patent No.: US 9,789,835 B2
(45) Date of Patent: Oct. 17, 2017

(54) KNEE PROTECTION STRUCTURE FOR VEHICLE

(71) Applicants: Hyundai Motor Company, Seoul (KR); Kia Motors Corporation, Seoul (KR); LG Hausys Ltd., Seoul (KR); Hyundai Mobis Co., Ltd., Seoul (KR)

(72) Inventors: Jae Hyun An, Seosan-si (KR); Il Sang Kim, Suwon-si (KR); Kwon Taek Kim, Anyang-si (KR); Hee June Kim, Daejeon (KR); Keun Chul Kim, Yongin-si (KR); Man Suk Bae, Yongin-si (KR)

(73) Assignees: HYUNDAI MOTOR COMPANY, Seoul (KR); KIA MOTORS CORPORATION, Seoul (KR); LG HAUSYS LTD., Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/965,651

(22) Filed: Dec. 10, 2015

(65) Prior Publication Data
US 2017/0001589 A1    Jan. 5, 2017

(30) Foreign Application Priority Data
Jul. 1, 2015  (KR) .......................... 10-2015-0093951

(51) Int. Cl.
*B60R 21/045*    (2006.01)
*B32B 5/02*    (2006.01)
(Continued)

(52) U.S. Cl.
CPC ............ *B60R 21/045* (2013.01); *B32B 5/024* (2013.01); *B32B 5/12* (2013.01); *B32B 5/26* (2013.01);
(Continued)

(58) Field of Classification Search
CPC ......... B60R 21/045; B32B 5/024; B32B 5/12; B32B 5/26; B32B 2260/023; B32B 2260/046; B32B 2262/10; B32B 2605/08
See application file for complete search history.

(56) References Cited

U.S. PATENT DOCUMENTS 4,455,338 A * 6/1984 Henne .................... B60K 37/00
                                                                      180/90
6,092,836 A * 7/2000 Saslecov ............... B60R 21/045
                                                                      280/730.1
(Continued)

FOREIGN PATENT DOCUMENTS

JP    05-201300 A    8/1993
JP    5-305850 A    11/1993
(Continued)

*Primary Examiner* — Faye M Fleming
(74) *Attorney, Agent, or Firm* — Morgan, Lewis & Bockius LLP

(57) ABSTRACT

A knee protection structure for a vehicle may include a bracket disposed on a vehicle body structure, and a lower crash pad panel disposed to be supported by the bracket so that a knee of a passenger hits the lower crash pad panel in the event of a collision, in which the lower crash pad panel may include a uni-directional continuous-fiber composite material, continuous fibers may be arranged in a given direction, inserted into at least a predetermined region of the entire region thereof, and a multi-directional continuous-fiber composite material, in which continuous fibers may be arranged in multiple directions, inserted into the remaining region.

14 Claims, 7 Drawing Sheets

(51) Int. Cl.
  *B32B 5/26*   (2006.01)
  *B32B 5/12*   (2006.01)
  *B60R 21/00*  (2006.01)

(52) U.S. Cl.
  CPC ... *B32B 2260/023* (2013.01); *B32B 2260/046* (2013.01); *B32B 2262/10* (2013.01); *B32B 2605/00* (2013.01); *B60R 2021/0051* (2013.01)

(56) References Cited

U.S. PATENT DOCUMENTS

| | | | | |
|---|---|---|---|---|
| 2004/0222619 | A1* | 11/2004 | DePue | B60R 21/2165 280/732 |
| 2004/0262954 | A1* | 12/2004 | Scheib | B62D 25/142 296/193.02 |
| 2005/0104405 | A1* | 5/2005 | Trappe | B60R 21/2165 296/70 |
| 2008/0124557 | A1* | 5/2008 | Freestone | B29C 44/1266 428/425.8 |
| 2012/0139214 | A1* | 6/2012 | Choi | B29C 45/0046 280/728.3 |

FOREIGN PATENT DOCUMENTS

| | | |
|---|---|---|
| JP | 05-305850 A | 11/1993 |
| JP | 2005-145109 A | 6/2005 |
| JP | 2005-225364 A | 8/2005 |
| JP | 2005-255159 A | 9/2005 |
| JP | 2006-111044 A | 4/2006 |
| JP | 2008-501562 A | 1/2008 |
| KR | 20-1998-0048831 U | 10/1998 |
| KR | 20-1999-0007417 U | 2/1999 |
| KR | 10-2005-0027544 A | 3/2005 |
| KR | 10-2005-0055083 A | 6/2005 |
| KR | 10-2007-0095794 A | 10/2007 |
| KR | 10-2008-0018529 A | 2/2008 |

* cited by examiner

KNEE PROTECTION STRUCTURE FOR VEHICLE

CROSS-REFERENCE TO RELATED APPLICATION

The present application claims priority to Korean Patent Application No. 10-2015-0093951, filed Jul. 1, 2015, the entire contents of which is incorporated herein for all purposes by this reference.

BACKGROUND OF THE INVENTION

Field of the Invention

The present disclosure relates to a knee protection structure for a vehicle. More particularly, it relates to a knee protection structure for a vehicle, which is capable of meeting more stringent passenger injury conditions of a vehicle collision test, of simplifying an assembly process, and of achieving a reduction in manufacturing costs.

Description of Related Art

In general, when a vehicle is involved in a collision while traveling, passengers in the vehicle are pushed to a front crash pad by inertia.

Accordingly, vehicles are essentially equipped with passenger constraining devices, for example, air bags and seat belts, in order to protect passengers in the event of an accident.

However, although the air bag or seat belt protects approximately the portion of the passenger's body above the abdomen, there is the risk of a cowl crossbar, which is located below the inside of the crash pad, and a lower crash pad panel, which forms the lower portion of the crash pad, hitting the knees of the occupants (i.e. both the driver and front-seat passenger).

As a provision for the above-described problem, in order to reduce the extent of injury to the passenger's knee, conventionally, a knee bolster, which is a knee protection device, is provided below the inside of the crash pad.

The prior art (related art) discloses a knee protection device in which a "U"-shaped outer panel formed of a plastic material and a "U"-shaped inner panel formed of a steel material are installed to define a space therebetween and a shock-absorbing member capable of absorbing shocks is installed in the space.

However, the plastic outer panel is very brittle in consideration of the load generated upon a collision and knee penetration, thereby forming a sharp edge that may inflict an injury on the knee when it is broken, and the steel inner panel may prevent sufficient deformation of the shock absorbing member.

FIG. 1 is a perspective view illustrating another configuration of a knee protection structure for a vehicle according to the related art. A shock-absorbing foam 3 is coupled to a U-shaped bracket 2 which is installed at one side of a cowl crossbar 1, and a lower crash pad panel 5 and a knee bolster panel 4 formed of steel or Glass-fiber Mat reinforced Thermoplastics (GMT) are coupled at the front side thereof.

Here, the lower crash pad panel 5 is manufactured of a polymer material such as, for example, polypropylene mineral filled (PPF) to cover the knee bolster panel 4 to impart a pleasant appearance, and the knee bolster panel 4, shock-absorbing foam 3, and U-shaped bracket 2 supporting the shock-absorbing foam 3 are sequentially arranged inside the lower crash pad panel 5.

With the configuration as described above, when the passenger's knee hits the lower crash pad panel 5 upon a front vehicle collision, the knee bolster panel 4 in the form of a steel body prevents additional knee penetration, and the shock-absorbing foam 3 located at the rear side thereof (i.e. the front side in terms of the front-and-rear direction of the vehicle) is deformed along with the U-shaped bracket 2 to absorb the energy of the shock.

However, since the lower crash pad panel 5 and the knee bolster panel 4 are installed separately from each other and the shock-absorbing foam 3 and the U-shaped bracket 2 are mounted, the related art has several problems including a complicated configuration and structure and high cost due to an increase in the number of components and hardware.

In addition, in the knee bolster device of the related art, although the steel knee bolster panel to control the penetration of the knee is mounted at the shock position of each of 50th percentile (50%) and 5th percentile (5%) dummies so as to prevent excessive penetration of the knee while allowing an increase in the load applied to the knee to some extent (i.e. up to 10 kN or less to satisfy the NCAP regulation), the knee bolster panel is considered a steel body in the US NCAP estimation, thereby increasing the knee load of the 50th percentile (50%) dummy. Therefore, it is difficult for the knee bolster panel to satisfy the regulation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a knee protection structure for a vehicle, which is capable of meeting more stringent passenger injury conditions of a vehicle collision test and of effectively protecting the keen of a passenger.

Additionally, various aspects of the present invention are directed to providing a knee protection structure for a vehicle, which is capable of achieving a simplified vehicle assembly process, a reduction in the number of components, a simplified structure, and reduced manufacturing costs.

According to various aspects of the present invention, a knee protection structure for a vehicle may include a bracket disposed on a vehicle body structure, and a lower crash pad panel disposed to be supported by the bracket so that a knee of a passenger hits the lower crash pad panel in the event of a collision, in which the lower crash pad panel may include a uni-directional continuous-fiber composite material, in which continuous fibers are arranged in a given direction, inserted into at least a predetermined region of the entire region thereof, and a multi-directional continuous-fiber composite material, in which continuous fibers are arranged in multiple directions, inserted into the remaining region.

The uni-directional continuous-fiber composite material may be inserted into both side portions in a left-and-right direction of an entire region of the lower crash pad panel, and the multi-directional continuous-fiber composite material, in which the continuous fibers are arranged in multiple directions, may be inserted into a central portion in the left-and-right direction of the lower crash pad panel.

The continuous-fiber composite material inserted into the side portions may have a smaller thickness than a thickness of the continuous-fiber composite material inserted into the central portion.

The multi-directional continuous-fiber composite material may be a woven type continuous-fiber composite material in which woven continuous fibers are stacked in multiple layers within thermoplastics.

The multi-directional continuous-fiber composite material may include the continuous fibers arranged lengthwise in a horizontal direction, in a vertical direction, or in an oblique direction.

The multi-directional continuous-fiber composite material may be an orthogonal type continuous-fiber composite material in which continuous fibers arranged in a given direction are stacked in multiple layers such that the continuous fibers of the respective layers are orthogonal to one another within thermoplastics.

The uni-directional continuous-fiber composite material may be a continuous-fiber composite material in which continuous fibers arranged lengthwise in a horizontal direction of the lower crash pad panel are stacked in multiple layers.

The uni-directional continuous-fiber composite material may be a continuous-fiber composite material in which continuous fibers arranged lengthwise in a vertical direction of the lower crash pad panel are stacked in multiple layers.

The uni-directional continuous-fiber composite material may be a continuous-fiber composite material in which continuous fibers arranged lengthwise in an oblique direction at a predetermined inclination angle based on a vertical axis of the lower crash pad panel are stacked in multiple layers.

The uni-directional continuous-fiber composite material, inserted into the at least predetermined region, may be divided into an upper layer and a lower layer by a predetermined thickness ratio, and the continuous fibers of the upper layer and the lower layer may have different directions.

At least one of the upper layer and the lower layer may include continuous fibers arranged lengthwise in a vertical direction, and at least one remaining of the upper layer and the lower layer may include continuous fibers arranged lengthwise in a horizontal direction.

The continuous fibers of the upper layer and the continuous fibers of the lower layer may be oblique continuous fibers arranged lengthwise in different oblique directions between the upper layer and the lower layer.

The continuous-fiber composite material, inserted into the at least predetermined region, may be divided into an upper layer and a lower layer by a predetermine thickness ratio, at least one of the upper layer and the lower layer may be formed of a uni-directional continuous-fiber composite material in which continuous fibers are arranged in a given direction, and at least one remaining of the upper layer and the lower layer may be formed of a multi-directional continuous-fiber composite material in which continuous fibers are arranged in multiple directions.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention is devised to provide a knee protection structure for a vehicle, which is capable of meeting more stringent passenger injury conditions of a vehicle collision test, of simplifying a vehicle assembly process, and of achieving, for example, a reduction in the number of components, a simplified structure, and reduced manufacturing costs.

Figure 1:
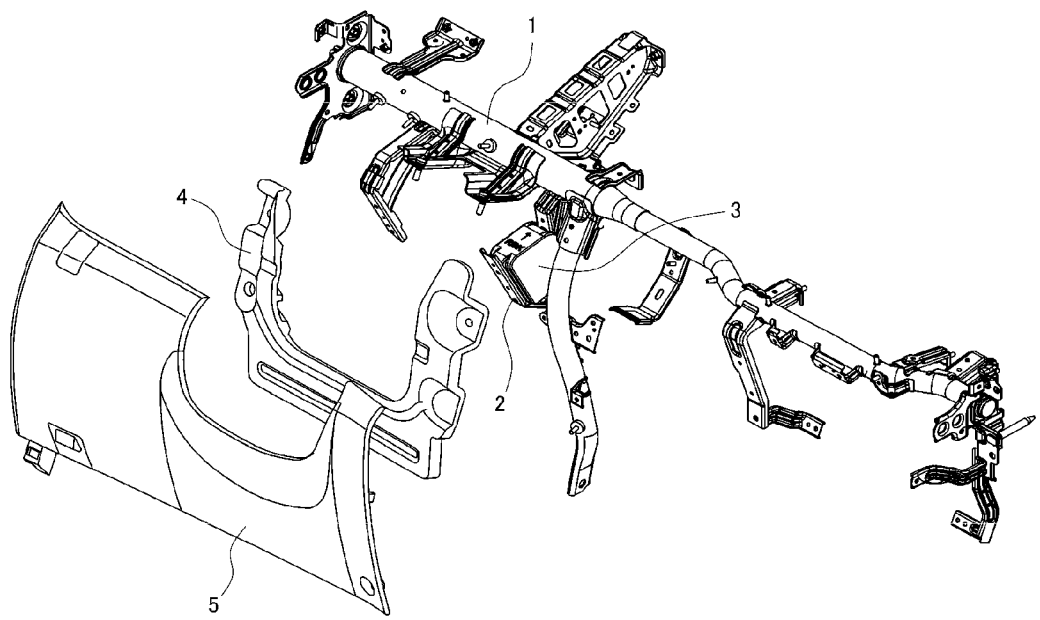
FIG. 1 is a perspective view illustrating the configuration of a knee bolster device for a vehicle according to the related art.
Figure 2:
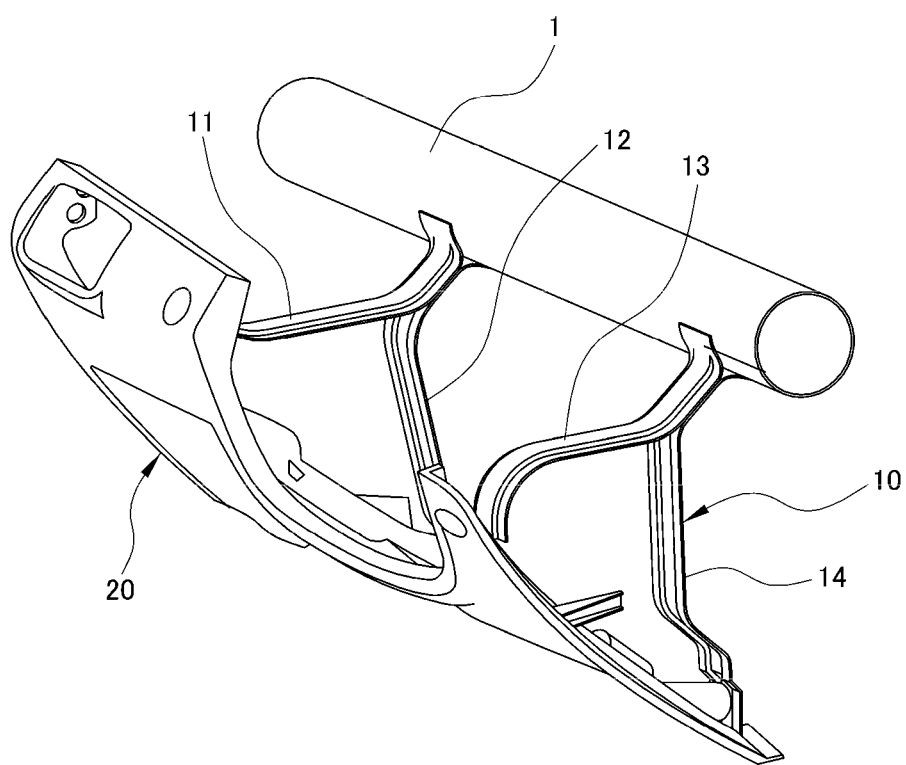
FIG. 2 is a perspective view illustrating an exemplary knee protection structure for a vehicle according to the present invention.

FIG. 2 is a perspective view illustrating a knee protection structure for a vehicle according to various embodiments of the present invention. In the knee protection structure of the various embodiments, a lower crash pad panel 20, which forms the lower portion of a crash pad, is used as a structure for the protection of the passenger's knee.

The knee protection structure of the various embodiments may be installed at the front lower side of a driver's seat to protect the driver's knee. The knee protection structure may include a bracket 10 installed to a cowl crossbar 1, which is a vehicle body structure, and the lower crash pad panel 20 supported by the bracket 10.

At this time, the knee protection structure is located at the front lower side of the driver's seat inside a vehicle in a state such that one end of the bracket 10 is fixed to the cowl crossbar 1 and the lower crash pad panel 20 is fixed to the other end of the bracket 10.

In the knee protection structure of the various embodiments described above, the lower crash pad panel 20 is directly supported by the cowl crossbar 1 via the bracket 10 to control the penetration of the knee thereto while absorbing shocks applied to the knee upon a vehicle collision. With this configuration, an additional knee-bolster panel of the related art may no longer be required.

Figure 3:
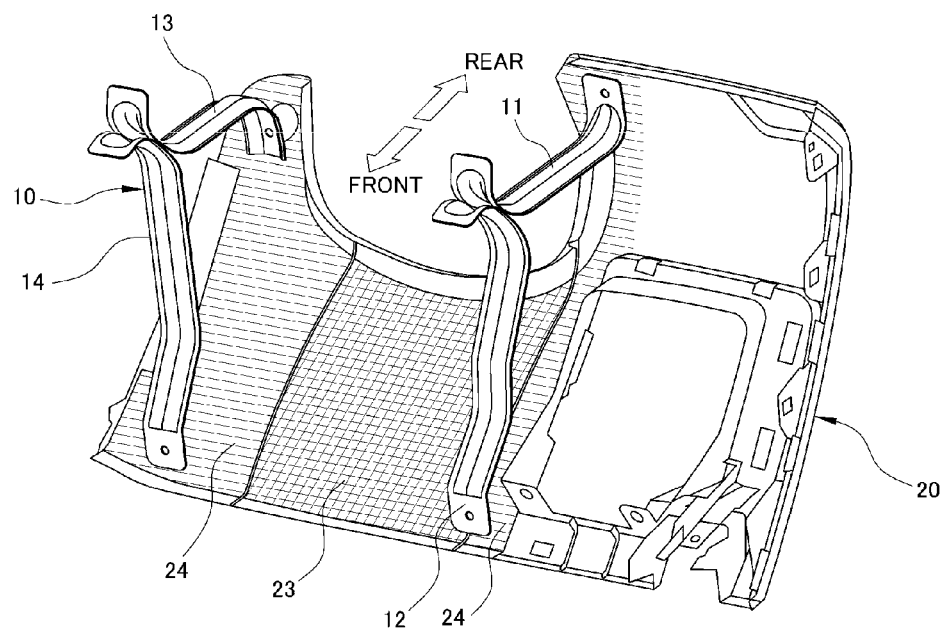
FIG. 3 is a perspective view illustrating an inner side configuration of a lower crash pad panel included in the exemplary knee protection structure for the vehicle according to the present invention.

FIG. 3 is a perspective view illustrating the inner side configuration of the lower crash pad panel included in the knee protection structure for the vehicle according to various embodiments of the present invention. FIG. 3 illustrates the coupled state of the bracket 10 and the lower crash pad panel 20.

In FIG. 3, front and rear directions are designated based on the front-and-rear direction of the vehicle, the inner side of the lower crash pad panel 20 is illustrated, and the rear space of the illustrated lower crash pad panel 20 is the space (driver's seat) in which a passenger (i.e. the driver) is present. As such, the knee of the passenger (driver) is located at the rear side of the lower crash pad panel 20.

As illustrated, there is no separate knee bolster panel, and the lower crash pad panel 20 is directly coupled to the bracket 10 which is installed to the cowl crossbar 1.

In addition, the bracket 10 may include a left upper bracket 11 and a left lower bracket 12, which support the lower crash pad panel 20 at the left side thereof, and a right upper bracket 13 and a right lower bracket 14, which support the lower crash pad panel 20 at the right side thereof.

In addition, the lower crash pad panel 20 prevents the knee of the passenger (driver) from penetrating to the front thereof when the knee of the passenger hits the lower crash pad panel 20 in the event of a vehicle collision. To this end, the lower crash pad panel 20 is injection-molded using a composite material that is an insertion material.

The composite material may be a continuous-fiber composite material such as, for example, Continuous Fiber Thermoplastics (CFT), which is capable of increasing the rigidity of the lower crash pad panel 20.

Figure 4:
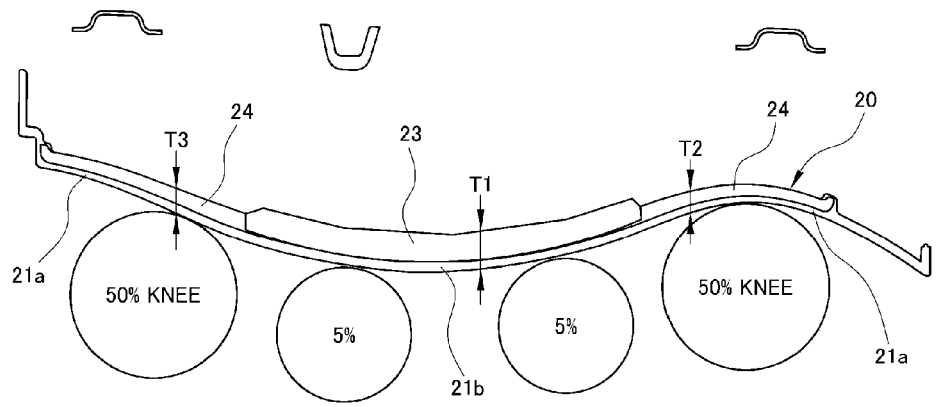
FIG. 4 is a sectional view illustrating a cross sectional shape and configuration of the lower crash pad panel of the exemplary knee protection structure according to the present invention.

FIG. 4 is a sectional view illustrating the cross sectional shape and configuration of the lower crash pad panel. When viewed in the cross section of the lower crash pad panel 20, left and right side portions 21a of the lower crash pad panel 20 correspond to knee collision regions of a 50th percentile (50%) dummy of a head-on collision regulation evaluation item of NCAP FMVSS 208, which is in effect in North America, and the central portion 21b corresponds to a knee collision region of a 5th percentile (5%) dummy.

In the following, portions of the lower crash pad panel 20, hit by the knee, based on the kinds of test dummies (50th percentile (50%) dummy and 5th percentile (5%) dummy) illustrated in FIG. 4 will be divided into both the side portions 21a and the central portion 21b on the basis of the left-and-right direction of the vehicle.

That is, the 50th percentile (50%) dummy collision region is both side portions 21a in the left-and-right direction of the lower crash pad panel 20, and the 5th percentile (5%) dummy collision region is the central portion 21b of the lower crash pad panel 20.

In the knee protection structure of the various embodiments, continuous-fiber composite materials 23 and 24, in which continuous fibers are stacked in multiple layers, are inserted inside the lower crash pad panel 20 which forms the external appearance of the knee protection structure. The continuous-fiber composite materials 23 and 24 increase the rigidity of the lower crash pad panel 20, thereby imparting the function of the knee-bolster panel of the related art, i.e. the function of suppressing the penetration of the knee of the passenger.

In various embodiments, as illustrated in FIG. 4, the thicknesses T1, T2 and T3 of the continuous-fiber composite materials 23 and 24 and the panel 20 including the same and the directions of the continuous-fiber composite materials 23 and 24 stacked in the cross section of the panel are differentiated respectively according to respective positions in the cross section of the lower crash pad panel 20.

That is, the thickness of the continuous-fiber composite material 24 inserted into both side portions 21a, which is the 50th percentile (50%) dummy collision region, may be less than the thickness of the continuous-fiber composite material 23 inserted into the central portion 21b, which is the 5th percentile (5%) dummy collision region, which may reduce the load applied to the knee and allow appropriate penetration of the knee.

Since the thicknesses of the inserted continuous-fiber composite materials 23 and 24 are determined to be less in both the side portions 21a than in the central portion 21b, in terms of the total thickness of the lower crash pad panel 20, the thicknesses T2 and T3 of both the side portions 21a are less than the thickness T1 of the central portion 21b.

This thickness difference serves to optimize the usage and weight of expensive composite materials based on the respective knee collision regions, which results in a reduction in consumed material costs.

In addition, the both side portions 21a and the central portion 21b have a difference in the direction of the continuous-fiber composite materials 23 and 24. The continuous-fiber composite materials applied to various embodiments of the present invention will be described below in more detail.

In the present invention, the continuous-fiber composite materials 23 and 24 inserted to the lower crash pad panel 20 are composite materials which consist of continuous fibers and thermoplastics and are manufactured by stacking the continuous fibers (long fibers) in the thermoplastics in multiple layers.

In addition, as the lower crash pad panel 20 is injection-molded by inserting the continuous-fiber composite materials 23 and 24, the rigidity of the lower crash pad panel 20 is increased.

Among the composite materials 23 and 24, a stack of fibers having continuity, i.e. the continuous fibers may be selected from among, for example, glass fibers (GF) and carbon fibers (CF), and the thermoplastics may be selected from among, for example, polypropylene (PP), polyamide (PA), and polyethylene terephthalate (PET). In the case where the continuous-fiber composite materials 23 and 24 are separately inserted into either side portion 21a and the central portion 21b of the lower crash pad panel 20 as described above, the continuous-fiber composite materials 23 and 24 are appropriately used based on the designed rigidity of the lower crash pad panel 20 for the respective regions divided into the side portions 21a and the central portion 21b.

At this time, the lower crash pad panel 20 may be manufactured via injection molding through the use of a polymer material such as, for example, Polypropylene Mineral Filled (PPF) material. At this time, the continuous-fiber composite materials 23 and 24, in which the continuous fibers are stacked in multiple layers, may be integrally inserted into the lower crash pad panel 20.

Figure 5:
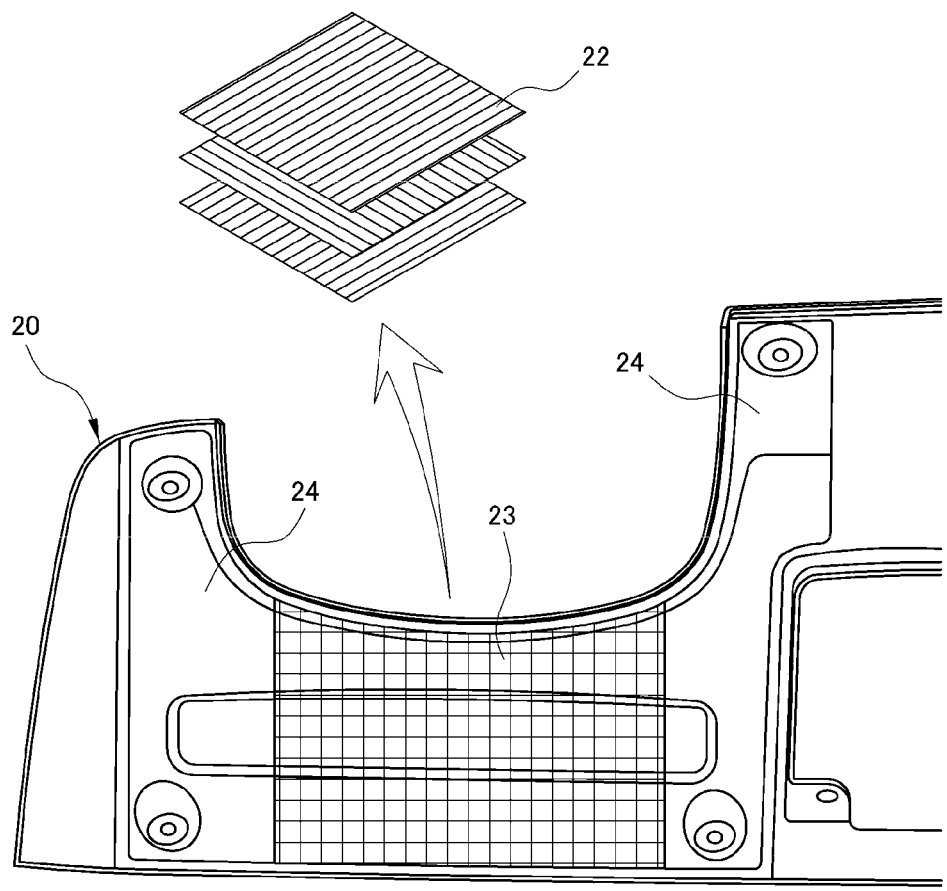
FIG. 5 is a view illustrating the state in which a continuous-fiber composite material is inserted into a central portion of the lower crash pad panel of the exemplary knee protection structure according to the present invention.

FIG. 5 is a view illustrating the state in which the continuous-fiber composite material is inserted into the central portion 21b of the lower crash pad panel 20. The continuous-fiber composite material 23, inserted into the central portion 21b, may be a multi-directional CFT material in which continuous fibers 22 are woven or arranged orthogonal to one another.

Figure 6:
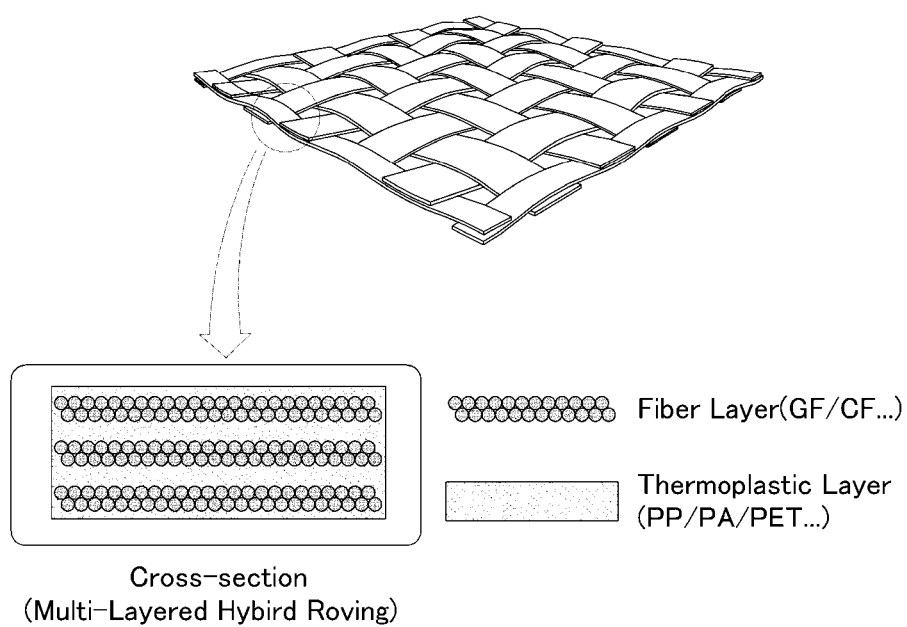
FIG. 6 is a view schematically illustrating the form of the continuous-fiber composite material inserted into the lower crash pad panel of the exemplary knee protection structure according to the present invention.

FIG. 6 is a view schematically illustrating the form of the continuous-fiber composite material inserted into the lower crash pad panel according to various embodiments of the present invention. The continuous fiber composite material is manufactured as fibers having continuity such as, for example, GF or CF stacked in multiple layers within thermoplastics such as, for example, PP, PA or PET.

At this time, the woven type multi-directional CFT material is manufactured to a configuration in which continuous fibers are interlaced like a net into a fabric and the resulting woven continuous fibers are stacked in multiple layers within thermoplastics.

In addition, the orthogonal type multi-directional CFT material, as illustrated in FIG. 5, has a configuration in which the continuous fibers 22 arranged in a given direction are stacked up and down such that layers of the continuous fibers 22 are orthogonal to each other within the thermoplastics.

As the multi-directional CFT material 23 is inserted into the central portion 21b of the lower crash pad panel 20 to increase the rigidity thereof, a torsional moment is generated in the central portion 21b based on the penetration of the knee when the knee region of a 50th percentile (50%) dummy collides with both the side portions 21a. Increasing the rigidity of the central portion 21b is required for the torsional moment.

Accordingly, when the multi-directional CFT material 23 in the form of a woven type or orthogonal type continuous fiber stack is inserted into the central portion 21b, the torsional moment of the central portion 21b is maximized.

In addition, as a result of increasing the rigidity of the central portion 21b of the lower crash pad panel 20 by applying the multi-directional CFT material 23 to the central portion 21b, it is possible to reduce the penetration of the knee of a 5th percentile (5%) dummy.

As described above, as the multi-directional CFT material 23, in which the continuous fibers are woven or arranged orthogonal to one another, is applied to the central portion 21b of the lower crash pad panel 20, the torsional rigidity of the central portion 21b with regard to the penetration of the knee of a 50th percentile (50%) dummy may be increased. Specifically, the penetration of the knee of the 50th percentile (50%) dummy in the North America FMVSS 208 collision regulation may be controlled, the distribution of hit positions due to torsion may be controlled, and the breakage of the panel due to shocks applied to the knee of a 5th percentile (5%) dummy may be prevented.

Although FIG. 5 illustrates various embodiments in which the multi-directional CFT material 23, in which horizontally lengthwise continuous fibers and vertically lengthwise continuous fibers are arranged orthogonal to each other, is installed to the central portion 21b of the lower crash pad panel 20, a multi-directional CFT material, in which continuous fibers arranged lengthwise in an oblique direction rather than the horizontal direction or the vertical direction are woven or arranged orthogonal to each other, may be installed.

At this time, the angle of the obliquely arranged continuous fibers in the central portion 21b of the lower crash pad panel 20 may have a tentative value, and, for example, a multi-directional CFT material, in which continuous fibers are obliquely arranged lengthwise at an inclination angle of 45 degrees, may be used.

Figure 7A:
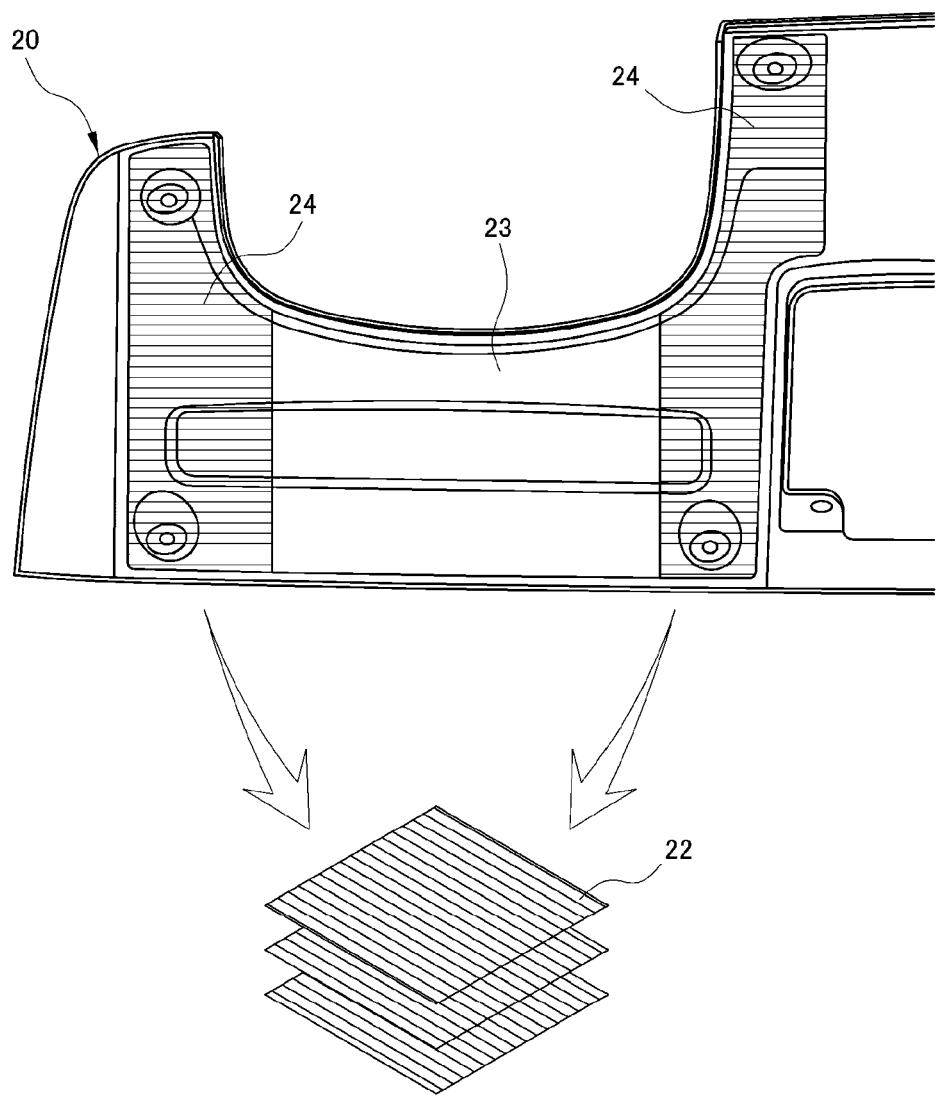
FIG. 7A and FIG. 7B are views illustrating a state in which a continuous-fiber composite material is inserted into both side portions of the lower crash pad panel of the exemplary knee protection structure according to the present invention.
Figure 7B:
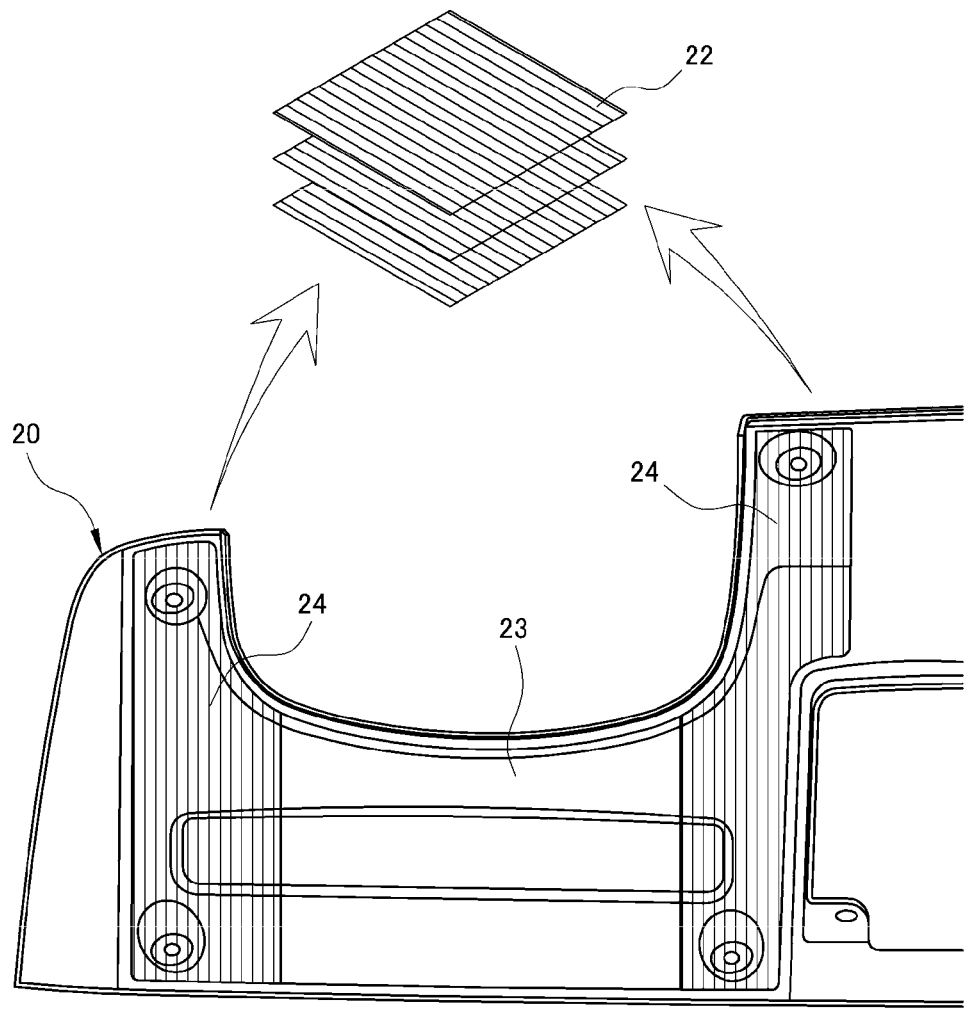

Meanwhile, FIGS. 7A and 7B are views illustrating the state in which the continuous-fiber composite material 24 is inserted into both side portions 21a of the lower crash pad panel 20 according to the present invention. The continuous fiber composite material 24, inserted into both side portions 21a, may be a uni-directional CFT material 24 in which the continuous fibers 22 are arranged in a given direction.

At this time, as exemplarily illustrated in FIG. 7A, a CFT material 24 in which the continuous fibers 22, arranged in the transverse direction (i.e. the horizontal direction) of the lower crash pad panel 20, are stacked in multiple layers, may be inserted. Alternatively, as exemplarily illustrated in FIG. 7B, a CFT material 24, in which the continuous fibers 22, arranged in the longitudinal direction (i.e. the vertical direction) of the lower crash pad panel 20, are stacked in multiple layers, may be inserted.

Although the uni-directional CFT material 24, the continuous fibers of which are arranged in the transverse direction, i.e. in the horizontal direction, or in the longitudinal direction, i.e. in the vertical direction, may be used, a uni-directional CFT material, in which continuous fibers are obliquely arranged at a predetermined inclination angle relative to the vertical axis, may be used.

In addition, when the uni-directional CFT material 24 is applied to both side portions of the lower crash pad panel 20, there may be applied a CFT material in which the total thickness of the CFT material is divided in a predetermined ratio (for example, the ratio of the upper layer thickness to the lower layer thickness may be 1:1) such that continuous fibers of the lower layer are horizontally arranged and continuous fibers of the upper layer are vertically arranged.

At this time, since the continuous fibers of each layer are arranged in a given direction and the directions of the continuous fibers of the upper and lower layers differ from each other, it can be said that the CFT material applied to the side portions generally has multi-directional characteristics.

In addition, when the uni-directional CFT material 24 is applied, continuous fibers of each layer may be obliquely arranged at a predetermined inclination angle, instead of applying the vertical continuous fibers and horizontal continuous fibers respectively to the upper and lower layers.

At this time, there may be applied a CFT material in which the continuous fibers of the upper layer and the continuous fibers of the lower layer are arranged at different inclination angles, and the continuous fibers of the two layers are arranged lengthwise in oppositely inclined directions, for example, at angles of +45 degrees and −45 degrees on the basis of the vertical axis.

In addition, a composite material, which is applied to the side portions of the lower crash pad panel 20, may be divided into upper and lower layers, such that a uni-directional CFT composite material, in which continuous fibers are arranged in a given direction, may be applied to one of the upper and lower layers, and multi-directional CFT material, in which continuous fibers are arranged in multiple directions, may be applied to the other one of the upper and lower layers.

Here, the CFT materials described above as being applied to detailed components, i.e. the central portion and either side portion of the lower crash pad panel 20 may be applied as the uni-directional CFT material and the multi-directional CFT material, which are applied to the respective layers in either side portion of the lower crash pad panel 20.

In the case where both side portions 21*a* of the lower crash pad panel 20, which is the 50th percentile (50%) dummy collision region, has a relatively small thickness and is provided with the uni-directional CFT material 24, both side portions 21*a* of the lower crash pad panel 20 may relieve the load applied to the knee of the passenger (driver).

In particular, as the thermoplastics of the inserted CFT material 24 in which the continuous fibers 22 are inserted serve as a tear line extending in the longitudinal direction of the continuous fibers in the event of a collision, both side portions 21*a*, which collides with the knee portion of the 50th percentile (50%) dummy, collapses in a given direction, thereby reducing the load applied to the knee.

As described above, by applying the uni-directional CFT material 24, in which the continuous fibers 22 are arranged in a given horizontal or vertical direction, to both side portions 21*a* of the lower crash pad panel 20, even if a load of a given level or more is applied in the event of a collision, the CFT material is cut or broken, thereby absorbing the energy of shocks. In this way, it is possible to satisfy the 50th percentile (50%) dummy collision estimation regulation of NCAP and to minimize injuries to the knee of the passenger by reducing the load applied to the knee.

As is apparent from the above description, in a knee protection structure for a vehicle according to the present invention, a lower crash pad panel is injection-molded by inserting continuous-fiber composite materials, which may increase the rigidity of the lower crash pad panel. In addition, as the kinds and thicknesses of continuous-fiber composite materials are differentiated according to the characteristics of respective portions hit by the passenger's knee, it is possible to increase torsional rigidity, to suppress the penetration of the knee, and to minimize the load applied to the knee.

The knee protection structure for the vehicle according to the present invention is capable of meeting more stringent passenger injury conditions of a vehicle collision test and of effectively protecting the passenger's knee.

In addition, the knee protection structure for the vehicle according to the present invention may achieve a reduction in the number of components via, for example, the omission of a knee bolster panel, a simplified configuration as well as a simplified vehicle assembly process, and reduced manufacturing costs.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A knee protection structure for a vehicle, comprising: a bracket disposed on a vehicle body structure; and a lower crash pad panel disposed to be supported by the bracket so that a knee of a passenger hits the lower crash pad panel in an event of a collision, wherein the lower crash pad panel includes a uni-directional continuous-fiber composite material, in which continuous fibers are arranged in a given direction, inserted into at least a predetermined region of an entire region thereof, and a multi-directional continuous-fiber composite material, in which continuous fibers are arranged in multiple directions, inserted into a remaining region of the lower crash pad panel.

2. The knee protection structure of claim 1, wherein the uni-directional continuous-fiber composite material is inserted into first and second side portions in a left-and-right direction of the entire region of the lower crash pad panel, and the multi-directional continuous-fiber composite material, in which the continuous fibers are arranged in the multiple directions, is inserted into a central portion in the left-and-right direction of the lower crash pad panel.

3. The knee protection structure of claim 2, wherein the continuous-fiber composite material inserted into the first and the second side portions has a smaller thickness than a thickness of the continuous-fiber composite material inserted into the central portion.

4. The knee protection structure of claim 1, wherein the multi-directional continuous-fiber composite material comprises a woven type continuous-fiber composite material in which woven continuous fibers are stacked in multiple layers within thermoplastics.

5. The knee protection structure of claim 4, wherein the multi-directional continuous-fiber composite material includes the continuous fibers arranged lengthwise in a horizontal direction, in a vertical direction, or in an oblique direction.

6. The knee protection structure of claim 1, wherein the multi-directional continuous-fiber composite material comprises an orthogonal type continuous-fiber composite material in which continuous fibers arranged in a given direction are stacked in multiple layers such that the continuous fibers of the respective layers are orthogonal to one another within thermoplastics.

7. The knee protection structure of claim 6, wherein the multi-directional continuous-fiber composite material includes the continuous fibers arranged lengthwise in a horizontal direction, in a vertical direction, or in an oblique direction.

8. The knee protection structure of claim 1, wherein the uni-directional continuous-fiber composite material comprises a continuous-fiber composite material in which continuous fibers arranged lengthwise in a horizontal direction of the lower crash pad panel are stacked in multiple layers.

9. The knee protection structure of claim 1, wherein the uni-directional continuous-fiber composite material comprises a continuous-fiber composite material in which continuous fibers arranged lengthwise in a vertical direction of the lower crash pad panel are stacked in multiple layers.

10. The knee protection structure of claim 1, wherein the uni-directional continuous-fiber composite material comprises a continuous-fiber composite material in which continuous fibers arranged lengthwise in an oblique direction at a predetermined inclination angle based on a vertical axis of the lower crash pad panel are stacked in multiple layers.

11. The knee protection structure of claim 1, wherein the uni-directional continuous-fiber composite material, inserted into the at least predetermined region, is divided into an upper layer and a lower layer by a predetermined thickness ratio, and the continuous fibers of the upper layer and the lower layer have different directions.

12. The knee protection structure of claim 11, wherein at least one of the upper layer and the lower layer includes continuous fibers arranged lengthwise in a vertical direction, and at least one remaining of the upper layer and the lower layer includes continuous fibers arranged lengthwise in a horizontal direction.

13. The knee protection structure of claim 11, wherein the continuous fibers of the upper layer and the continuous fibers of the lower layer are oblique continuous fibers arranged lengthwise in different oblique directions between the upper layer and the lower layer.

14. The knee protection structure of claim 1, wherein the continuous-fiber composite material, inserted into the at least predetermined region, is divided into an upper layer and a lower layer by a predetermine thickness ratio, at least one of the upper layer and the lower layer is formed of a uni-directional continuous-fiber composite material in which continuous fibers are arranged in a given direction, and at least one remaining of the upper layer and the lower layer is formed of a multi-directional continuous-fiber composite material in which continuous fibers are arranged in multiple directions.

\* \* \* \* \*